April 13, 1948.  H. M. PORTER  2,439,485
ADJUSTMENT MECHANISM FOR MICROSCOPES
Filed April 17, 1946
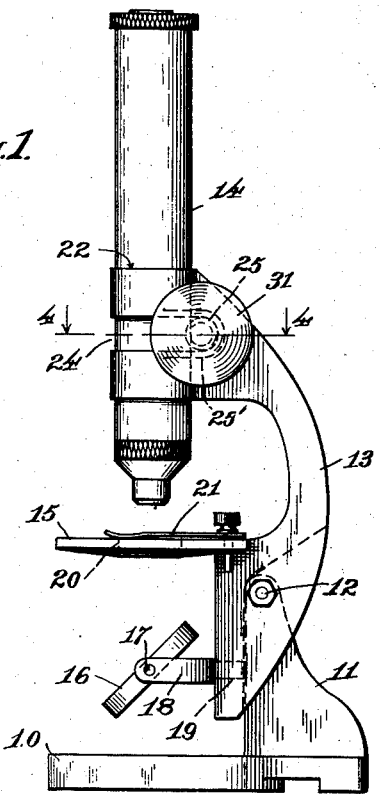
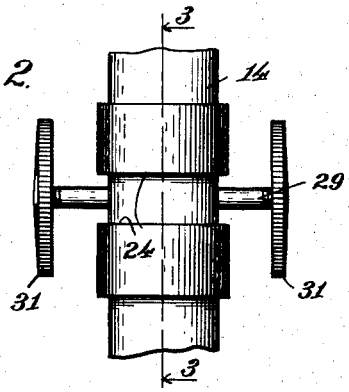
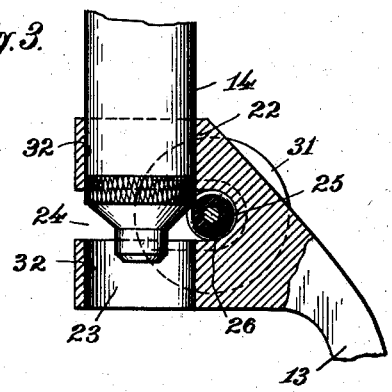
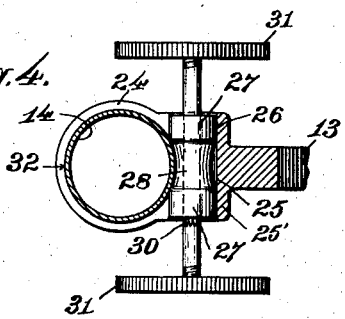
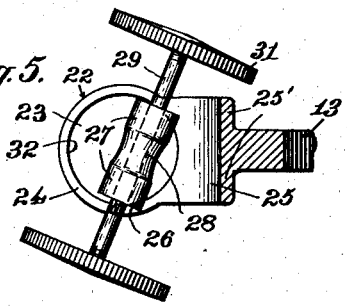
Inventor:
Harold M. Porter
by Melvin W. Sandmeyer
His Attorney.

Patented Apr. 13, 1948

2,439,485

UNITED STATES PATENT OFFICE 2,439,485

ADJUSTMENT MECHANISM FOR MICROSCOPES

Harold M. Porter, Hagerstown, Md., assignor to The Mitchel-Tyler Company, Hagerstown, Md., a corporation of Maryland Application April 17, 1946, Serial No. 662,823

8 Claims. (Cl. 88—39)

1

This invention relates to microscopes, and particularly to microscopes which can be manufactured and assembled at low cost.

One of the most objectionable features common to low-cost microscopes is the tendency of the lens barrel to wabble in its supporting bearings, so that it is both difficult to get the proper range or sight on the object being viewed, and to keep the object steadily in range while focusing and viewing the same. A further objectionable feature is the cost of manufacture, assembly and maintenance, particularly as to placing the barrel and operating or focusing means within the head.

An object of the invention is to provide an improved construction whereby the lens barrel will be held steady within the supporting head so as to eliminate the wabbling of the barrel.

A further object of the invention is to provide an improved construction of the head of the microscope so that the barrel and operating means may be easily and quickly assembled therein, or removed therefrom as desired, either for cleaning, substitution, repair or other purposes.

Other objects will appear hereinafter.

The invention will be more readily understood by reference to the accompanying drawings, illustrating a preferred embodiment of the invention, and in which:

Fig. 1 is a side elevation of a microscope embodying the invention,

Fig. 2 is a fragmentary front elevation of a portion of the microscope, upon an enlarged scale, illustrating the mounting of the body or tube in the head of the instrument, Fig. 3 is a vertical section of the same taken on the line 3—3 of Fig. 2, but illustrating the body or tube as being inserted in the head or mounting, Fig. 4 is a section on the line 4—4 of Fig. 1, also upon an enlarged scale, and Fig. 5 is a similar view with the body or tube removed, and illustrating the frictional focusing pinion and shaft as being inserted in the bearings.

Referring to the drawings, 10 indicates the base of the microscope having a standard 11 upon which is pivotally mounted as at 12, the limb or supporting member 13 of the instrument. The limb 13 supports the lens barrel 14, stage 15, and sub-stage mirror 16, so that, as the limb is swung on the pivot 12, the several parts move therewith without change in their relative positions.

The mirror 16 is pivotally mounted as at 17 between the arms of a yoke 18, and the yoke is provided with a stem 19 by which it is pivotally mounted in the limb, adjacent the lower end thereof. The axes of the pivots 17 and 19 are at right angles to each other so that the mirror may be oriented with relation to the stage and the source of light.

The stage 15 is preferably fixed to the limb 13, and comprises a rectangular, normally horizontal plate having a centrally located aperture 20 through which light from the mirror 16 is reflected. The usual spring arms 21 are provided for holding the slides in position on the stage.

The upper end of the limb 13 is provided with a head 22 integral therewith and having a vertical bore 23 for a barrel 14. The bore 23 is slightly greater in diameter than the barrel in order that the latter may be readily inserted therein when assembling the device, and is easily slidably adjusted therein when in use, without any tendency to binding.

The head 22 is formed with a slot or opening 24 extending horizontally therethrough from one edge and terminating in a semi-cylindrical recess 25 in the upper end of the limb. Said recess 25 is elongated transversely of the head to substantially the diameter of the bore 23, by flanges 25' upon opposite sides of the limb 13, and constitutes a bearing for a friction pinion 26 by means of which the lens barrel may be slidably adjusted in focusing. The friction pinion 26 is formed of rubber or other suitable material, and comprises cylindrical end portions 27 fitting in the bearing 25, and an intermediate contracted or grooved portion 28 to engage the barrel 14, the proportions being such that the periphery of the grooved portion, when the pinion is in its bearings, extends slightly into the path of the barrel. This not only provides the necessary frictional contact between the barrel and the pinion, but also prevents displacement of the pinion when the instrument is assembled.

The frictional resilient pinion 26 is mounted upon an axle 29 having a roughened or knurled portion 30 within the pinion to prevent relative rotation thereof. Threaded upon the ends of the axle 29 are milled heads 31 for operating the pinion. This construction provides means whereby the pinion 26 may be readily replaced should it become ineffective, due to wear or deterioration.

With a microscope as above described, the barrel 14 and pinion 26 may be readily and quickly assembled. The pinion is first inserted through the slot or recess 24, as illustrated in Fig. 5, until it is seated in the bearings 25; after which the barrel is lowered through the bore 23 until it firmly engages the pinion, and may then be further lowered by turning the pinion; although this latter is not necessary, as the barrel may be easily moved into position by merely pushing the same downwardly until the lower end passes the pinion and into fully assembled position.

It should be noted that, when the instrument is assembled, the barrel is provided with a three point bearing, namely, the pinion 26, and the portions 32 of the faces of the bore 23 diametrically opposite to the pinion and above and below the axial plane thereof as shown clearly in Fig. 3 of the drawings. This, together with the grooved portion of the pinion holds the barrel sufficiently firm to prevent wabbling; and also locks the pinion in place in its bearings. No other elements are necessary to form the three point bearing for the barrel, or for holding said bearings in position, than the elements as above described.

It will be seen from the foregoing that I have provided a microscope which can be manufactured and assembled at extremely low cost and in which the lens barrel can be readily adjusted and held steady and without lost motion or wabbling at all times.

While I have illustrated and described a particular embodiment of my invention, it is to be understood that such equivalents are contemplated as may be embraced within the terms of the accompanying claims.

What is claimed is:

1. In a microscope, a support including a head having a bore therethrough, a lens barrel slidably mounted in said bore, said head having a slot extending from one edge across said bore, said slot having the outer end open and the inner end closed to provide a bearing integral with said head, a friction pinion mounted in said bearing with its periphery engaging said barrel to actuate the same, and means for actuating said pinion.

2. In a microscope, a support including a head having a bore therethrough, a lens barrel slidably mounted in said bore, said head having a slot extending from one edge across said bore and providing at its inner end a bearing integral with said head, a friction pinion mounted in said bearing with its periphery engaging said barrel to actuate the same, and means for actuating said pinion, the width of said slot being at least equal to the diameter of said pinion whereby the pinion may be inserted in the slot through the open end thereof prior to inserting the barrel in the bore, and said barrel holding said pinion in said bearing after being inserted in assembled position.

3. In a microscope, a supporting member including a head having a bore therethrough, a lens barrel slidably mounted in said bore, said head having a slot extending from one edge across said bore, said slot having the outer end open and the inner end closed to provide a semi-cylindrical bearing at the inner end of said slot, a friction pinion in said bearing having cylindrical end portions and an annular contracted portion intermediate said end portions to engage said barrel, and means for turning said pinion.

4. In a microscope, a supporting member including a head having a bore therethrough, a barrel in said bore, said head having a slot extending from one edge across said bore, said slot having the outer end open and the inner end closed to provide a semi-cylindrical bearing at the inner end of said slot, a friction pinion in said bearing having cylindrical end portions and an annular contracted portion intermediate said end portions to engage said barrel, and means for turning said pinion.

5. In a microscope, a supporting member including a head having a vertical bore, a barrel freely slidable in said bore, said head having a slot extending from one edge across said bore, said slot having the outer end open and the inner end closed to provide a semi-cylindrical bearing, a friction pinion in said bearing, said pinion having cylindrical end portions fitting said bearing and an annular contracted portion intermediate said end portions to engage said barrel, said pinion and the faces of said bore above and below said slot and diametrically opposite said pinion constituting a three point bearing for said barrel.

6. In a microscope, a supporting member including a head having a vertical bore, a barrel freely slidable in said bore, said head having a slot extending from one edge across said bore, said slot having the outer end open and the inner end closed to provide a semi-cylindrical bearing, a friction pinion in said bearing for adjusting said barrel, and means for actuating said pinion, the width of said slot being at least equal to the diameter of said pinion whereby the pinion may be placed in position through the open end of said slot prior to inserting the barrel in said bore.

7. In a microscope, a supporting member including a head having a vertical bore, a barrel slidable in said bore, said head having a slot extending from one edge across said bore, said slot having the outer end open and the inner end closed to provide a semi-cylindrical bearing, a friction pinion in said bearing, said pinion having cylindrical end portions fitting said bearing and an annular contracted portion intermediate said end portions to engage said barrel, and means for actuating said pinion, the width of said slot being at least equal to the diameter of said pinion whereby the pinion may be placed in position through the open end of said slot prior to inserting the barrel in the bore, and said barrel locking said pinion in said bearing after being inserted in assembled position.

8. In a microscope, a supporting member including a head having a vertical bore, a barrel slidable in said bore, said head having a slot extending from one edge across said bore, said slot having the outer end open and the inner end closed to provide a semi-cylindrical bearing, flanges on opposite sides of said head constituting lateral extensions of said bearing, a friction pinion in said bearing, said pinion having cylindrical end portions fitting in said extensions of said bearing, and an annular contracted portion intermediate said end portions to engage said barrel, and means for actuating said pinion.

HAROLD M. PORTER.

REFERENCES CITED

The following references are of record in the file of this patent:

UNITED STATES PATENTS

| Number | Name | Date |
|---|---|---|
| 47,860 | Richards | May 23, 1865 |

FOREIGN PATENTS

| Number | Country | Date |
|---|---|---|
| 13,242 | Great Britain | 1908 |
| 291,598 | Great Britain | June 7, 1928 |